United States Patent
Kaji

(10) Patent No.: US 10,319,111 B2
(45) Date of Patent: Jun. 11, 2019

(54) IMAGE PROJECTION DEVICE FOR 3D MEASUREMENT AND CALIBRATION METHOD FOR CALIBRATION OF CAMERA AND PROJECTOR

(71) Applicant: SONY CORPORATION, Tokyo (JP)

(72) Inventor: Yohsuke Kaji, Chiba (JP)

(73) Assignee: SONY CORPORATION, Tokyo (JP)

( * ) Notice: Subject to any disclaimer, the term of this patent is extended or adjusted under 35 U.S.C. 154(b) by 306 days.

(21) Appl. No.: 14/571,707

(22) Filed: Dec. 16, 2014

(65) Prior Publication Data

US 2015/0189267 A1 Jul. 2, 2015

(30) Foreign Application Priority Data

Dec. 27, 2013 (JP) ................................. 2013-273260

(51) Int. Cl.
  *G06T 7/80* (2017.01)
  *H04N 9/31* (2006.01)
  *G06T 5/00* (2006.01)
  *G06T 3/00* (2006.01)

(52) U.S. Cl.
  CPC .............. *G06T 7/80* (2017.01); *G06T 3/0093* (2013.01); *G06T 5/006* (2013.01); *H04N 9/3182* (2013.01); *H04N 9/3185* (2013.01); *H04N 9/3194* (2013.01); *G06T 2207/10024* (2013.01)

(58) Field of Classification Search
  None
  See application file for complete search history.

(56) References Cited

U.S. PATENT DOCUMENTS

| 7,911,500 | B2* | 3/2011 | Uchihashi | H04N 9/3194 348/180 |
| 2005/0254726 | A1* | 11/2005 | Fuchs | H04N 5/74 382/285 |
| 2011/0176007 | A1* | 7/2011 | Ding | H04N 9/3182 348/189 |
| 2011/0261260 | A1* | 10/2011 | Gruen | H04N 5/275 348/575 |
| 2012/0092461 | A1* | 4/2012 | Fisker | A61B 5/0068 348/46 |
| 2012/0212627 | A1* | 8/2012 | Klose | H04N 9/3182 348/189 |
| 2013/0258060 | A1* | 10/2013 | Kotake | G01C 11/025 348/46 |

* cited by examiner

Primary Examiner — Samira Monshi
(74) Attorney, Agent, or Firm — Chip Law Group

(57) ABSTRACT

There is provided an image projection device including a camera, a projector configured to project an image, a camera calibration unit configured to perform calibration of the camera, a projector calibration unit configured to perform calibration of the projector, and an image correction unit configured to correct the image projected from the projector based on a result of the calibration. The projector calibration unit performs ray tracing of a known checker pattern on which structural light is projected by the projector, and estimates parameters by acquiring correspondence relation between a lattice point of the checker pattern and projector coordinates.

18 Claims, 18 Drawing Sheets

IMAGE COORDINATES (x', y')
WITH DISTORTION

IMAGE COORDINATES (x, y)
WITH DISTORTION

FIG. 10
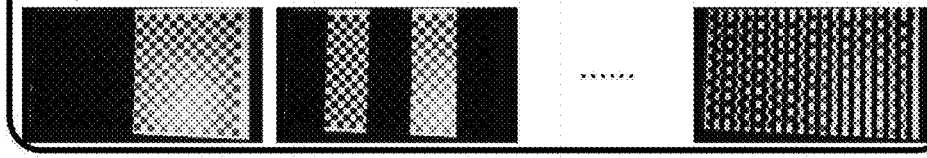
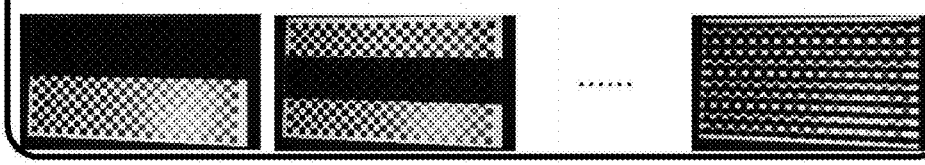

FIG. 12
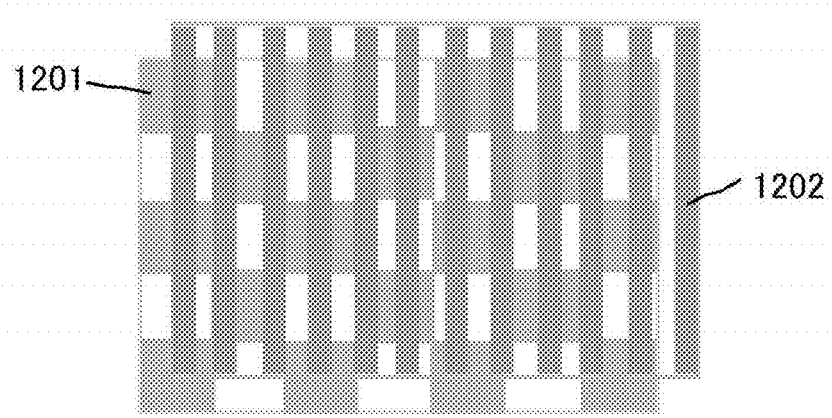
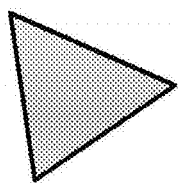
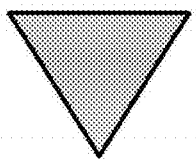
CAMERA UNIT 104   PROJECTION UNIT 101

IMAGE PROJECTION DEVICE FOR 3D MEASUREMENT AND CALIBRATION METHOD FOR CALIBRATION OF CAMERA AND PROJECTOR

CROSS REFERENCE TO RELATED APPLICATIONS

This application claims the benefit of Japanese Priority Patent Application JP 2013-273260 filed Dec. 27, 2013, the entire contents of which are incorporated herein by reference.

BACKGROUND

The technology disclosed in the present specification relates to an image projection device capable of performing three-dimensional measurement by photographing a projection image with a camera and a calibration method thereof. There is known a three-dimensional measurement device combining a projector and a camera. In such a kind of device, a projector projects a known pattern image on an object, and the object on which the pattern image is projected is photographed with a camera. Then, the photographed image is subjected to image processing, thereby three-dimensional information of the object can be obtained.

In the device combining a projector and a camera, it is necessary to perform calibration of parameters regarding both the projector and the camera. The estimation of parameters with high accuracy has a problem of long man-hours for adjustment. For example, the method for projecting a calibration pattern using a calibration marker attached on a plane mirror, a screen, and a projection device is proposed for a three-dimensional form measurement device capable of performing calibration of projector parameters and camera parameters using only the inner structure of the three-dimensional measurement device without requiring arrangement of a special marker in calibration, by embedding a reference object for calibration in the system and automatically calculating world coordinates using a length of the plane mirror that is an invariant (see JP 2013-214206A, for example).

Moreover, in the projector calibration, there is proposed a three-dimensional form measurement device capable of preventing projector parameters from being inaccurate by using a group of intersection coordinates of a horizontal slit pattern and a vertical slit pattern as image coordinates used for projector calibration without including therein coordinates outside the image coordinate range used in camera calibration (see JP 2007-309660A, for example).

SUMMARY

It is desirable to provide an excellent image projection device capable of performing three-dimensional measurement by photographing a projection image with a camera and performing calibration of parameters with high accuracy with a small number of man-hours for adjustment, and a calibration method thereof.

The present disclosure is made in view of the above problems. According to an embodiment of the present disclosure, there is provided an image projection device including a camera, a projector configured to project an image, a camera calibration unit configured to perform calibration of the camera, a projector calibration unit configured to perform calibration of the projector, and an image correction unit configured to correct the image projected from the projector based on a result of the calibration. The projector calibration unit performs ray tracing of a known checker pattern on which structural light is projected by the projector, and estimates parameters by acquiring correspondence relation between a lattice point of the checker pattern and projector coordinates.

According to another embodiment of the present disclosure, the projector calibration unit of the image projection device according to the embodiment may perform calibration while considering lens distortion of the projector or without using a calibration result by the camera calibration unit.

According to another embodiment of the present disclosure, the projector calibration unit of the image projection device according to the embodiment may estimate distortion parameters by evaluating a distortion amount based on a group of lattice points supposed to be in a straight line on the projector coordinates, and estimates parameters of the projector based on correspondence relation between a lattice point on an image after distortion correction and world coordinates.

According to another embodiment of the present disclosure, the projector calibration unit of the image projection device according to the embodiment may estimate the distortion parameters of the projector by a Levenberg-Marquardt (LM) method, with an inclination difference between two candidates of straight lines on which a group of lattice points are supposed to be in a straight line as a distortion evaluation amount.

According to another embodiment of the present disclosure, the projector calibration unit of the image projection device according to the embodiment may estimate a perspective projection matrix including internal parameters and external parameters of the projector by nonlinear optimization, based on correspondence relation between the lattice point on the image after distortion correction and the world coordinates.

According to another embodiment of the present disclosure, the projector calibration unit of the image projection device according to the embodiment may estimate the perspective projection matrix by performing the nonlinear optimization of a re-projection error between detection image coordinates of the camera and re-projection image coordinates by the LM method.

According to another embodiment of the present disclosure, the projector calibration unit of the image projection device according to the embodiment may find correspondence relation between the lattice point of the checker pattern and the projector coordinates with sub-pixel accuracy.

According to another embodiment of the present disclosure, the projector calibration unit of the image projection device according to the embodiment may find LocalHomography of calibration of projector pixels limited to surroundings of the lattice point.

According to another embodiment of the present disclosure, the projector calibration unit of the image projection device according to the embodiment may find LocalHomography of the projector pixels with a limit to a surrounding area of the lattice point small enough to ignore influences of lens distortion of the projector.

According to another embodiment of the present disclosure, the projector calibration unit of the image projection device according to the embodiment may find the LocalHomography of the projector pixels by performing robust estimation while considering a decoding error of the structural light.

According to another embodiment of the present disclosure, the camera calibration unit of the image projection device according to the embodiment may detect the lattice point from an image obtained by photographing the known checker pattern with the camera, estimates distortion parameters by evaluating a distortion amount based on a group of lattice points supposed to be in a straight line, and estimates parameters of the camera based on correspondence relation between a lattice point on an image after distortion correction and world coordinates.

According to another embodiment of the present disclosure, the camera calibration unit of the image projection device according to the embodiment may estimate the distortion parameters of the camera by an LM method, with an inclination difference between two candidates of straight lines on which a group of lattice points are supposed to be in a straight line as a distortion evaluation amount.

According to another embodiment of the present disclosure, the camera calibration unit of the image projection device according to the embodiment may estimate a perspective projection matrix including internal parameters and external parameters of the camera by nonlinear optimization, based on correspondence relation between the lattice point on the image after distortion correction and the world coordinates.

According to another embodiment of the present disclosure, the camera calibration unit of the image projection device according to the embodiment may estimate the perspective projection matrix by performing the nonlinear optimization of a re-projection error between detection image coordinates of the camera and re-projection image coordinates by the LM method.

According to another embodiment of the present disclosure, the image projection device according to the embodiment may further include a ray tracing formulation unit configured to formulate ray tracing for tracing world coordinates obtained by projecting a pixel on the projector coordinates with ray influenced by lens distortion.

According to another embodiment of the present disclosure, the image projection device according to the embodiment may further include a reverse ray tracing formulation unit configured to formulate reverse ray tracing for tracing a pixel on the projector coordinates irradiated with the ray for projecting world coordinates while considering influences of lens distortion.

According to another embodiment of the present disclosure, the reverse ray tracing formulation unit of the image projection device according to the embodiment may perform ray tracing of a gray code projected by the projector on the checker pattern with known world coordinates, calculates a corresponding point of the world coordinates and the projector coordinates in a state with projector distortion, estimates a distortion correction function, obtains correspondence relation between the world coordinates and projection coordinates having no distortion, and formulates reverse ray tracing.

According to another embodiment of the present disclosure, the ray tracing formulation unit of the image projection device according to the embodiment may estimate a reverse distortion correction function D' for correcting the projector coordinates having no distortion to projector coordinates having distortion, and formulates ray tracing for tracing world coordinates projected on a projector pixel.

According to another embodiment of the present disclosure, at least one of the camera calibration unit and the projector calibration unit of the image projection device according to the embodiment may estimate the parameters with high accuracy with a small number of photographed images, using known depth information of a depth from the camera to a checker board.

According to another embodiment of the present disclosure, a calibration method of an image projection device including a camera and a projector, the calibration method including performing ray tracing of a known checker pattern on which structural light is projected by the projector, and estimating parameters by acquiring correspondence relation between a lattice point of the checker pattern and projector coordinates. In the technology disclosed in the present specification, it is possible to provide an excellent image projection device capable of performing three-dimensional measurement by photographing a projection image with a camera and performing calibration of parameters with high accuracy with a small number of man-hours for adjustment, and a calibration method thereof.

An image projection device to which the technology disclosed in the present specification is applied can perform calibration of a projector without using a result by a camera calibration unit and estimate parameters of the projector with high accuracy. Moreover, the image projection device to which the technology disclosed in the present specification is applied can estimate parameters with high accuracy while considering lens distortion of the projector and find correspondence relation between world coordinates and projector pixels with sub-pixel accuracy.

Moreover, the image projection device to which the technology disclosed in the present specification is applied can formulate ray tracing and reverse ray tracing while considering projector distortion.

Moreover, the image projection device to which the technology disclosed in the present specification is applied can estimate, using known depth information, parameters with high accuracy based on a small number of photographed images.

Note that the effects described in the present specification are merely examples, and the effects of the present disclosure are not limited thereto. Moreover, the present disclosure may exert additional effects other than the above-described effects.

Other intentions, features, and advantages of the technology disclosed in the present specification will become clear by the following detail description based on the later-described embodiment and appended drawings.

BRIEF DESCRIPTION OF THE DRAWINGS

FIG. 10 is a diagram for explaining a projector coordinate calculation method using gray codes;

FIG. 12 is a diagram illustrating a situation in which a checker board 1201 on which the projection unit 101 projects structural light 1202 is photographed by a camera unit 104;

DETAILED DESCRIPTION OF THE EMBODIMENT(S)

Figure 1:
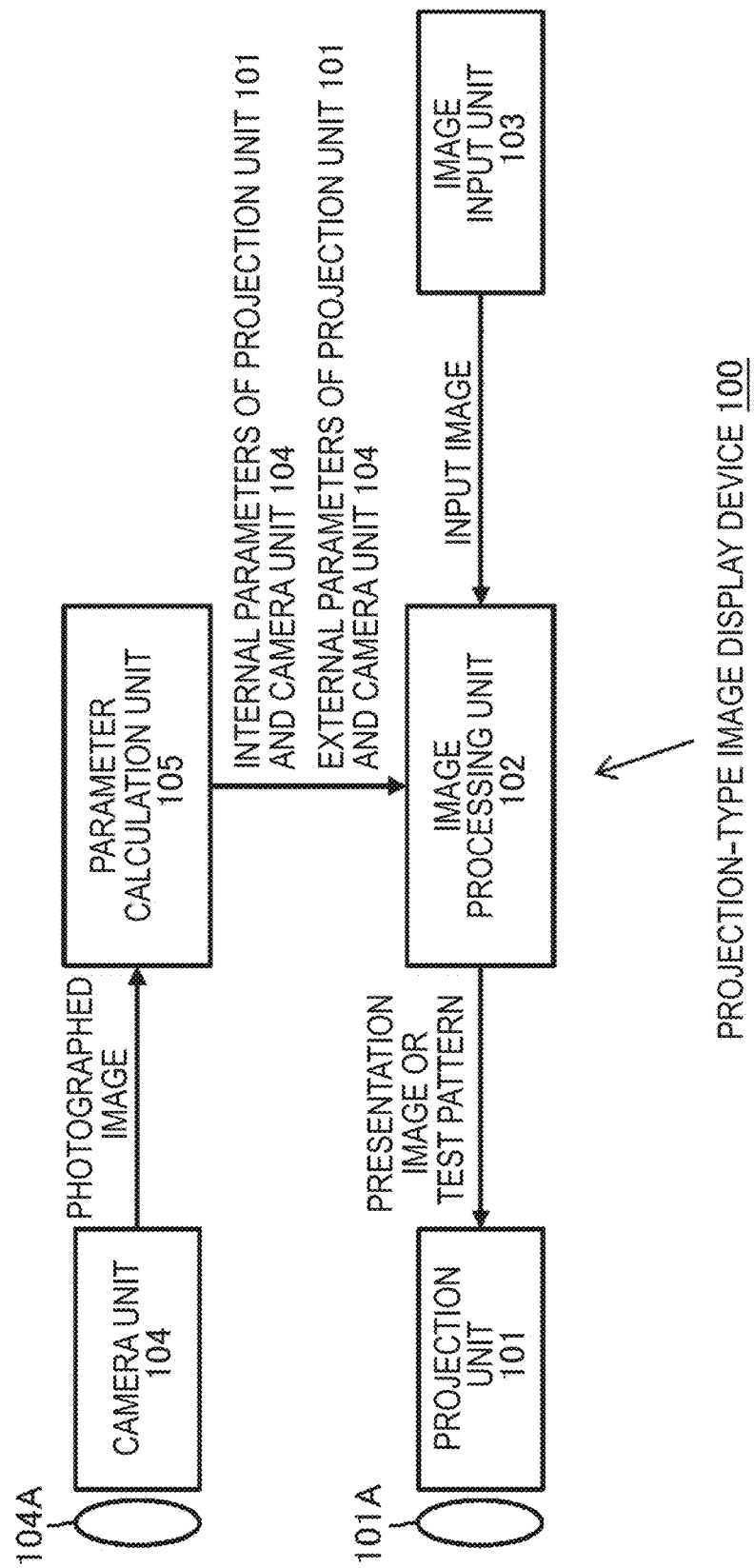
FIG. 1 is a diagram schematically illustrating a configuration of a projection-type image display device 100 according to an embodiment of the technology disclosed in the present specification.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

FIG. 1 schematically illustrates a configuration of the projection-type image display device 100 according to an embodiment of the technology disclosed in the present specification. One use of the projection-type image display device 100 is enlarged projection of a screen, and another use is three-dimensional measurement. The projection-type image display device 100 illustrated in FIG. 1 includes a projection unit 101, the image processing unit 102, an image input unit 103, the camera unit 104, and a parameter calculation detection unit 105. Hereinafter, each unit will be described. The image input unit 103 inputs an image signal from a projection image supply source such as a personal computer, a television (TV) receiver, a Blu-ray Disc disk reproducing device, and a game machine (any of them is not illustrated).

The image processing unit 102 processes an image projected from the projection unit 101. The image output from the image processing unit 102 is an external image supplied from the image input unit 103 and a test pattern generated in the image processing unit 102. The image processing unit 102 also corrects an input image from the image input unit 103 based on parameters supplied from the parameter calculation unit 105.

The projection unit 101 projects an image output from the image processing unit 102 on a body to be projected through a projection lens 101A. The body to be projected is an object displaying an enlarged image of a screen, for example, and an object of three-dimensional measurement, for example.

The camera unit 104 is disposed at a position different from an irradiation position of the projection unit 101, and an optical axis is set such that a photographed range includes an irradiation range of the projection unit 101 as much as possible. Then, an image obtained by light condensed through the condenser lens 104A is photographed. In the embodiment, the camera unit 104 photographs a screen or an object to be measured in a state where an image such as a test pattern is projected by the projection unit 101. An imaging element of the camera unit 104 is a charge coupled device (CCD) or a complementary metal oxide semiconductor (CMOS), for example, and in the following, a pixel is also referred to as a "camera pixel". In addition, the coordinate system of a camera pixel is also referred to as "camera coordinates".

The parameter calculation unit 105 calculates parameters using a projection image photographed with the camera 104 and outputs them to the image processing unit 102. The parameters calculated by the parameter calculation unit 105 include parameters contained in a distortion correction function for correcting lens distortion, internal parameters of the projection unit 101 and the camera unit 104, and external parameters of the projection unit 101 and the camera unit 104. According to the technology disclosed in the present specification, the parameter calculation unit 105 calculates parameters with high accuracy with a small number of man-hours for adjustment. The detail will be described later.

Figure 2:
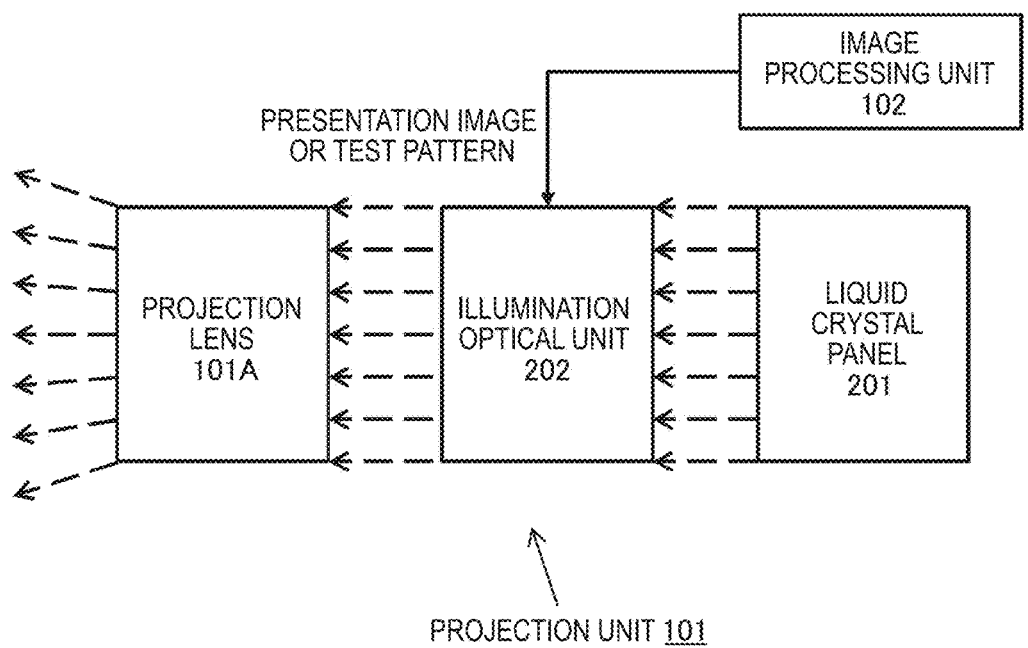
FIG. 2 is a diagram illustrating an inner configuration example of a projection unit 101.

FIG. 2 illustrates an inner configuration example of the projection unit 101. The projection unit 101 illustrated in FIG. 2 includes a liquid crystal panel 201, an illumination optical unit 202, a liquid crystal panel drive unit 204, and a projection optical unit 203. The liquid crystal panel drive unit 204 drives the liquid crystal panel 201 based on image signals input from the image processing unit 102 and draws a presentation image or a test pattern on the display screen. A pixel of the liquid crystal panel 201 is also referred to as a "projector pixel" in the following. Moreover, the coordinate system of the liquid crystal panel 201 is also referred to as "projector coordinates".

The illumination optical unit 202 irradiates the liquid crystal panel 201 from the back face. When the projection-type image display device 100 is a pico-projector, a light emitting diode (LED) or laser, for example, is used as a light source of the illumination optical unit 202. The projection lens 101A includes one or two or more optical lenses, and performs enlarged projection of light passing through the liquid crystal panel 201 on a body to be projected (not illustrated).

The projection unit 101 projects an input image to the image input unit 103 or a test pattern generated in the projection-type image display device 100. In the embodiment, the projection unit 101 projects gray codes of a vertical pattern and a horizontal pattern as a test pattern, and the camera unit 104 photographs them. The detail will be described later.

Figure 3:
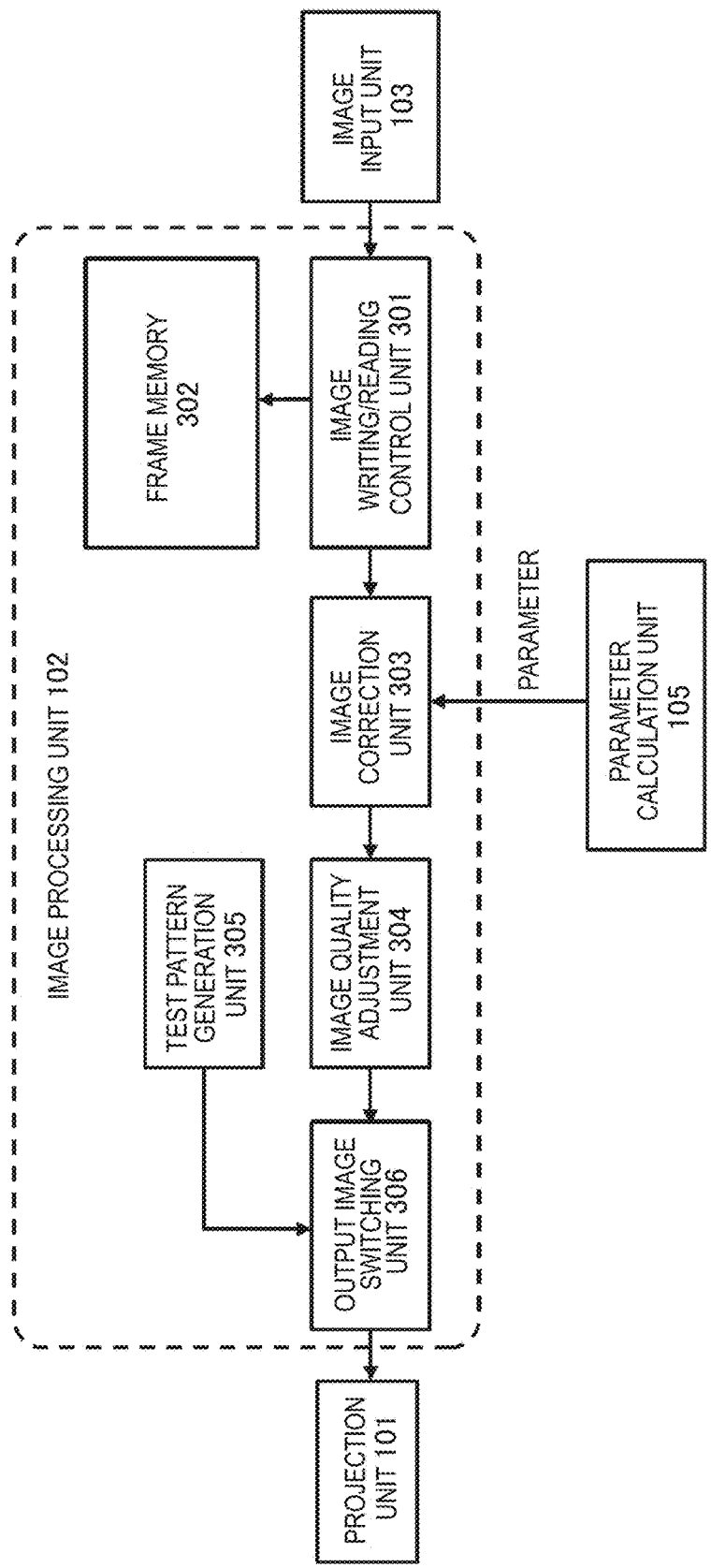
FIG. 3 is a diagram illustrating an inner configuration example of an image processing unit 102.

FIG. 3 illustrates an inner configuration example of the image processing unit 102. The image processing unit 102 illustrated in FIG. 3 includes an image writing/reading control unit 301, a frame memory 302, an image correction unit 303, an image quality adjustment unit 304, a test pattern generation unit 305, and an output image switching unit 305. The frame memory 302 stores images supplied from the image input unit 103. The image writing/reading control unit 301 controls writing and reading of image frames relative to the frame memory 302.

The image correction unit 303 corrects an image read out from the frame memory 302 based on parameters received from the parameter calculation unit 105 so that distortion occurred when projected on a screen from the projection unit 101 is solved.

The image quality adjustment unit 304 performs image quality adjustment of brightness, contrast, synchronization, tracking, color density, and color tone, for example, so that the projection image after distortion correction is in a desired display state.

The test pattern generation unit 305 generates a test pattern used when the correction amount detection unit 105 calculates projective transformation parameters. In the embodiment, the gray codes having a vertical pattern and a horizontal pattern are used as test patterns.

The output image switching unit 306 switches images output to the projection unit 101. For example, when input images from an image supply source such as a personal computer, a TV receiver, a media reproducing device, and a game machine (any of them is not illustrated) are projected on a screen to make a presentation, for example, the output image switching unit 306 outputs output images from the image quality correction unit 304 to the projection unit 101. Moreover, when parameters of the projection unit 101 and the camera unit 104 are calculated, the output image switching unit 306 outputs a test pattern generated by the test pattern generation unit 305 to the projection unit 101. When three-dimensional measurement is performed using the projector (projection unit 101) and the camera (camera unit 104) such as the projection-type image display device 100 illustrated in FIG. 1, it is necessary to perform calibration of internal parameters of the projector and the camera and external parameters of the projector and the camera. The technology disclosed in the present specification aims at calculating parameters with high accuracy with a small number of man-hours for adjustment.

Figure 4:
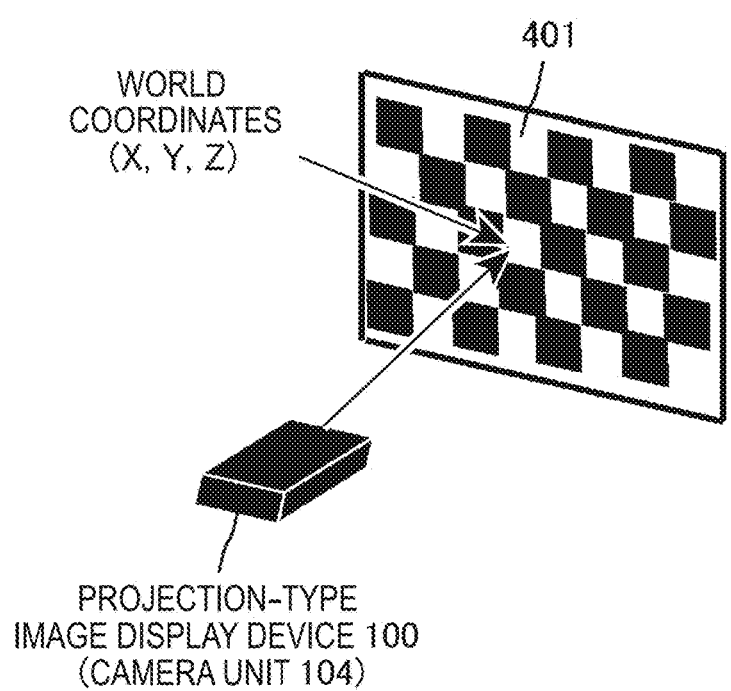
FIG. 4 is a diagram for explaining a basic view of calibration.
Figure 5:
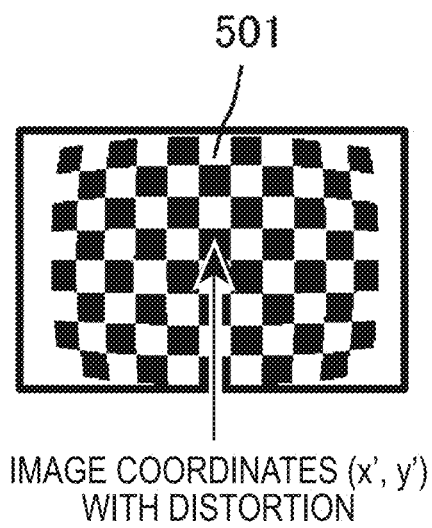
FIG. 5 is a diagram for explaining a basic view of calibration.
Figure 6:
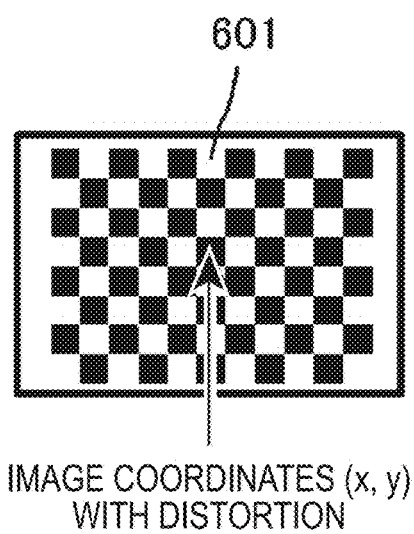
FIG. 6 is a diagram for explaining a basic view of calibration.

Here, the internal parameters of the camera include an image center (main point) $(o_x, o_y)$, a focal length f, and an effective size of a pixel (a size per pixel) $(k_x, k_y)$. Moreover, the external parameters of the camera are determined depending on a position T and an attitude R of a camera coordinate system in a world coordinate system. The position T moves in parallel and is expressed by a 3×1 vector. The attitude R rotates and is represented by a 3×3 matrix. The basic view of calibration will be described with reference to FIG. 4 to FIG. 6. First, as illustrated in FIG. 4, the camera unit 104 of the projection-type image display device 100 photographs an object 401 with known world coordinates (X, Y, Z). As illustrated in FIG. 5, image coordinates (x', y') of a photographed image 501 by the camera unit 104 has distortion. When the distortion correction is performed on the image coordinates (x', y') having distortion, the image coordinates (x, y) not having distortion is obtained, as illustrated in FIG. 6.

Moreover, the projection unit 101 of the projection-type image display device 100 projects the object 401 with the known world coordinates (X, Y, Z). As illustrated in FIG. 5, imaging surface observed coordinates (x', y') of the projection image 501 by the projection unit 101 has distortion. When the distortion correction is performed on the image coordinates (x', y') having distortion, an image 601 with the image coordinates (x, y) not having distortion is presented, as illustrated in FIG. 6. The model expression of the camera and the projector is as the following expression (1), as a relational expression of the image coordinates (x, y) having no distortion, the imaging surface image coordinates (x', y'), and the world coordinates (X, Y, Z).

$$\begin{bmatrix} x \\ y \\ 1 \end{bmatrix} = D \begin{bmatrix} x' \\ y' \\ 1 \end{bmatrix} = K[R|T] \begin{bmatrix} X \\ Y \\ Z \\ 1 \end{bmatrix} \quad (1)$$

In the above expression (1), the D is a distortion correction function.

With distortion center coordinates $(d_{cx}, d_{cy})$, a distance r from the distortion center is expressed as the following expression (2). Moreover, with distortion coefficients $k_1$ to $k_3$, radius distortion $\Delta r$ is expressed as the following expression (3). Moreover, with tangent distortion coefficients $p_1$, $p_2$, tangent distortion $\Delta t_x$, $\Delta t_y$ is expressed as the following expressions (4), (5), respectively. The imaging surface observed coordinates (x', y') can be expressed as the following expression (6) using the distance r from the distortion center, the radius distortion $\Delta r$, and the tangent distortion $\Delta t_x$, $\Delta t_y$.

$$r = \sqrt{(x - d_{cx})^2 + (y - d_{cy})^2} \quad (2)$$

$$\Delta r = k_1 r^2 + k_2 r^4 + k_3 r^6 - (k_1 r_0^2 + k_2 r_0^4 + k_3 r_0^6)\frac{r}{r_0} \quad (3)$$

$$\Delta t_x = p_1(r^2 + 2x^2) + 2p_2 xy \quad (4)$$

$$\Delta t_y = p_2(r^2 + 2y^2) + 2p_1 xy \quad (5)$$

$$(x', y') = \left(x + \Delta r \frac{x}{r} + \Delta t_x, y + \Delta r \frac{y}{r} + \Delta t_y\right) \quad (6)$$

In the above expression (1), the K is internal parameters, and [R|T] is external parameters. The K[R|T] is a perspective projection matrix and is expressed as the following expression (7).

$$\begin{bmatrix} fx & 0 & cx \\ 0 & fy & cy \\ 0 & 0 & 1 \end{bmatrix} \begin{bmatrix} R_{xx} & R_{xy} & R_{xz} & T_x \\ R_{yx} & R_{yy} & R_{yz} & T_y \\ R_{zx} & R_{zy} & R_{zz} & T_z \end{bmatrix} \quad (7)$$

In the internal parameters, f=(fx, fy) is a focal length and c=(cx, cy) is a main point. In the external parameters, the R is a rotating component, and the T is a translation component.

In the above expression (1), the estimation of a perspective projection matrix based on the corresponding point of the world coordinates (X, Y, Z) and the image coordinates (x', y') is an optimization problem. It is possible to estimate the above internal parameters and external parameters by resolving such an optimization problem. With the image coordinates (x, y) detected by photographing by the camera 104 and the image coordinates (x', y') re-projected by the projection unit 101, a re-projection error is expressed as the following expression (8). The perspective projection matrix can be estimated by performing nonlinear optimization of a geometrically significant re-projection error using the Levenberg-Marquardt (LM) method.

$$\text{sqrt}((x-x')^2 + (y-y')^2) \quad (8)$$

Figure 7:
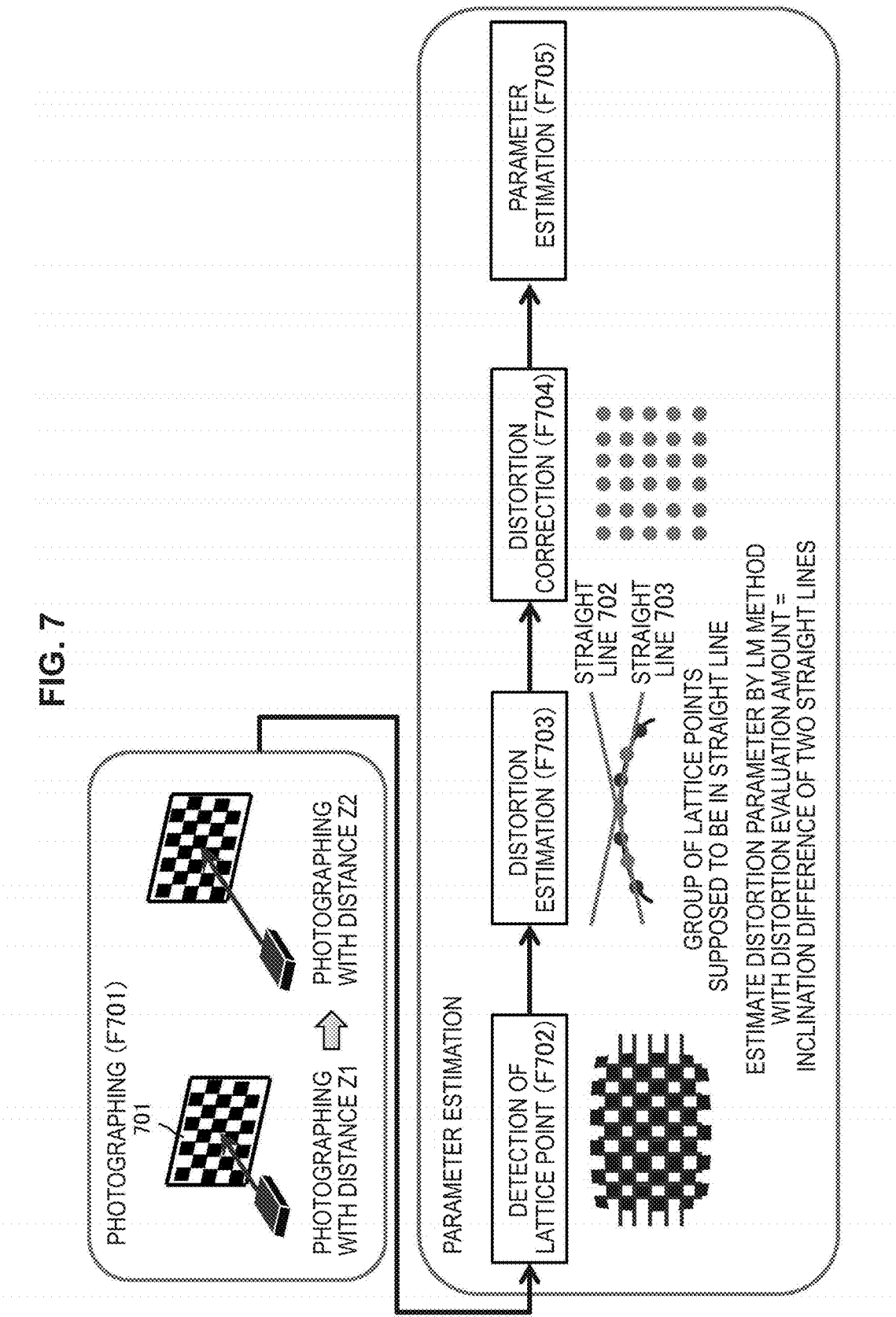
FIG. 7 is a diagram illustrating a processing flow of calibration of a camera.

The processing flow of calibration of the camera will be described with reference to FIG. 7. The camera unit 104 photographs, from a plurality of distances Z1 and Z2, a checker board 701 with a latticed pattern, as an object with known world coordinates (F701). It is supposed that the depth information of the distances Z1 and Z2 is known.

The parameter calculation unit 105 detects lattice points of the checker pattern based on the photographed image of the checker board 701 (F702). Next, a group of lattice points supposed to be in a line is extracted, and distortion parameters are estimated by nonlinear optimization such as the LM method, for example, with a difference of inclination of two straight lines 702, 703 on which a group of lattice points are supposed to be arranged, as a distortion evaluation amount (F703). As described above, the distortion parameters include distortion center coordinates ($d_{cx}$, $d_{cy}$), distortion coefficients $k_1$ to $k_3$, and tangent distortion coefficients $p_1$, $p_2$ (as described above).

Next, the photographed image coordinates (x', y') are corrected to image coordinates (x, y) having no distortion using the estimated distortion parameters (F704). The relation of the corresponding point of the world coordinates (X, Y, Z) and the image coordinates (x, y) is expressed as the following expression (9) using the perspective projection matrix K[R|T]. The perspective projection matrix is estimated by nonlinear optimization such as the LM method based on the corresponding point of the world coordinates (X, Y, Z) and the image coordinates (x, y) (F705). The K is internal parameters, and the R and the T are respectively a rotating component and a translation component relative to the checker board 701 in the external parameters.

$$\begin{bmatrix} x \\ y \\ 1 \end{bmatrix} = K[R \mid T] \begin{bmatrix} X \\ Y \\ Z \\ 1 \end{bmatrix} \quad (9)$$

Figure 8:
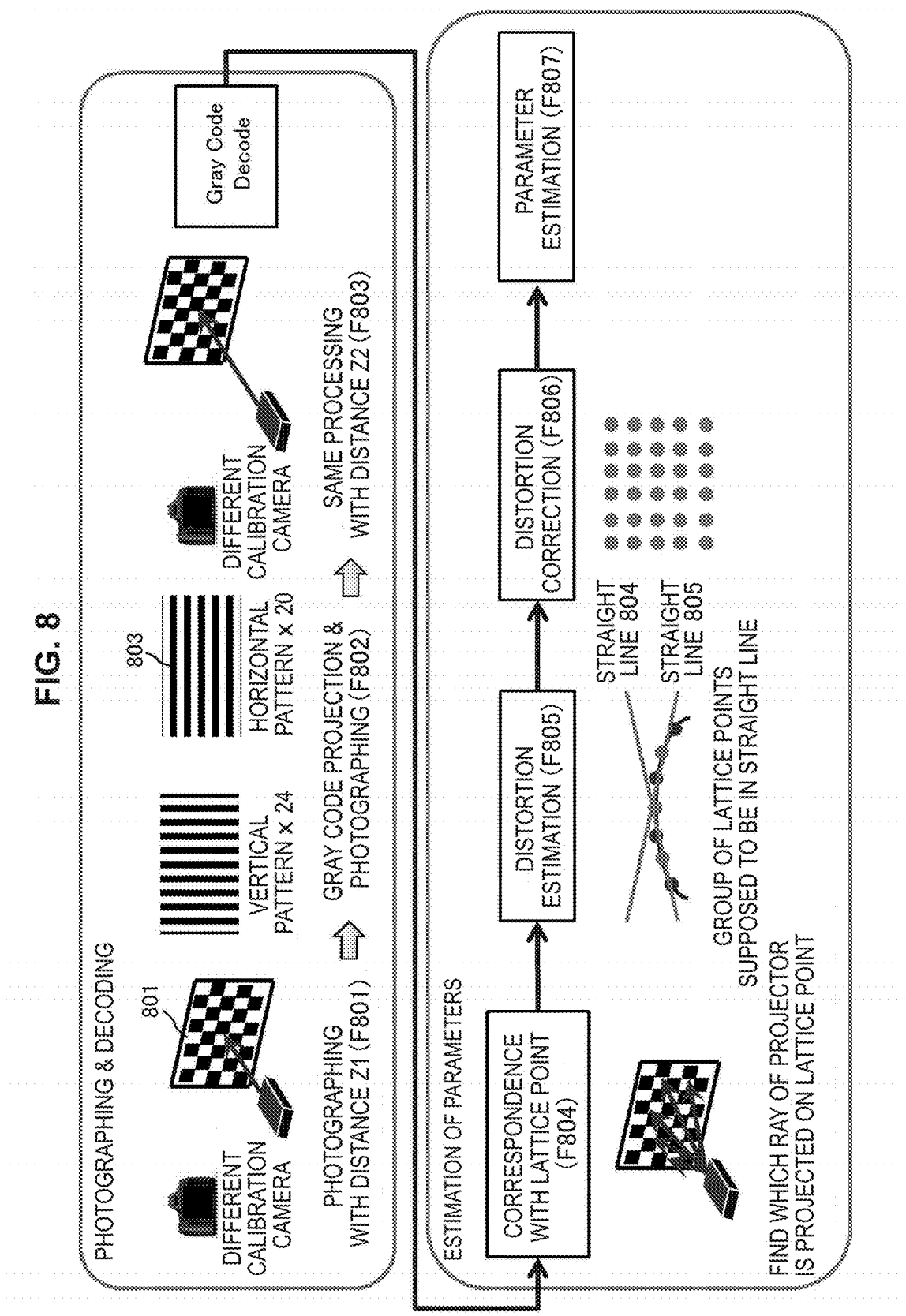
FIG. 8 is a diagram illustrating a processing flow of calibration of a projector.

Subsequently, the processing flow of calibration of the projector will be described with reference to FIG. 8.

First, a calibration camera photographs, from the distance Z1, a checker board 801 with a latticed pattern, as an object with known world coordinates (F801). The calibration camera may be the camera unit 104. It is supposed that the depth information of the distances Z1 is known. Next, the projection unit 101 alternately projects 24 patterns of gray codes constituted by the combination of vertical straight lines 802 and 20 patterns of gray codes constituted by the combination of horizontal straight lines 803 on the checker board 801, and the calibration camera photographs the gray codes every time they are projected (F802). Then, the distance from the checker board 801 to the calibration camera is changed to Z2, and the photographing of the checker board 801 by the calibration camera and the projection and the photographing of the gray codes are performed repeatedly (F803). It is supposed that the depth information of the distance Z2 is known.

Figure 9:
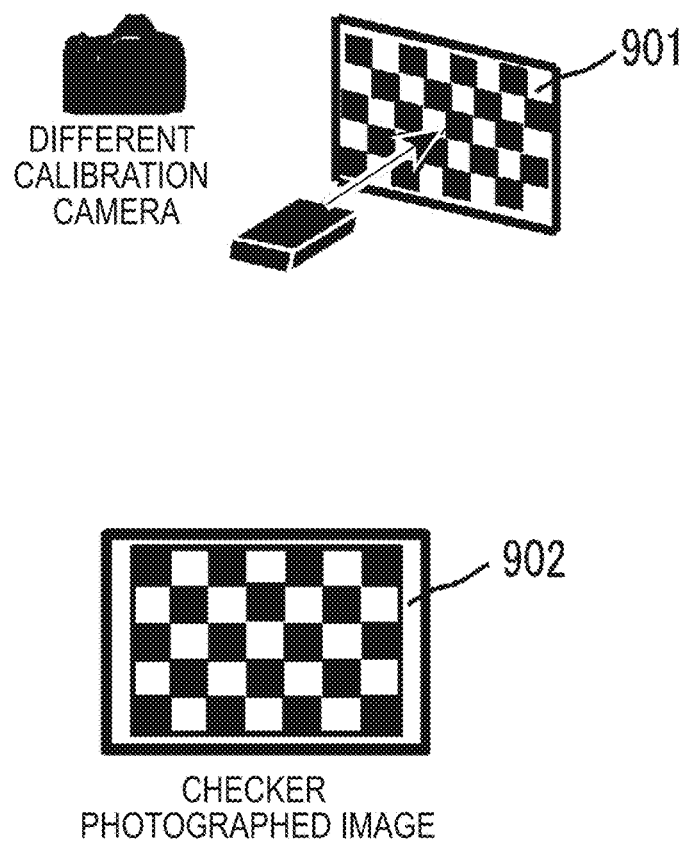
FIG. 9 is a diagram for explaining a projector coordinate calculation method using gray codes.
Figure 11:
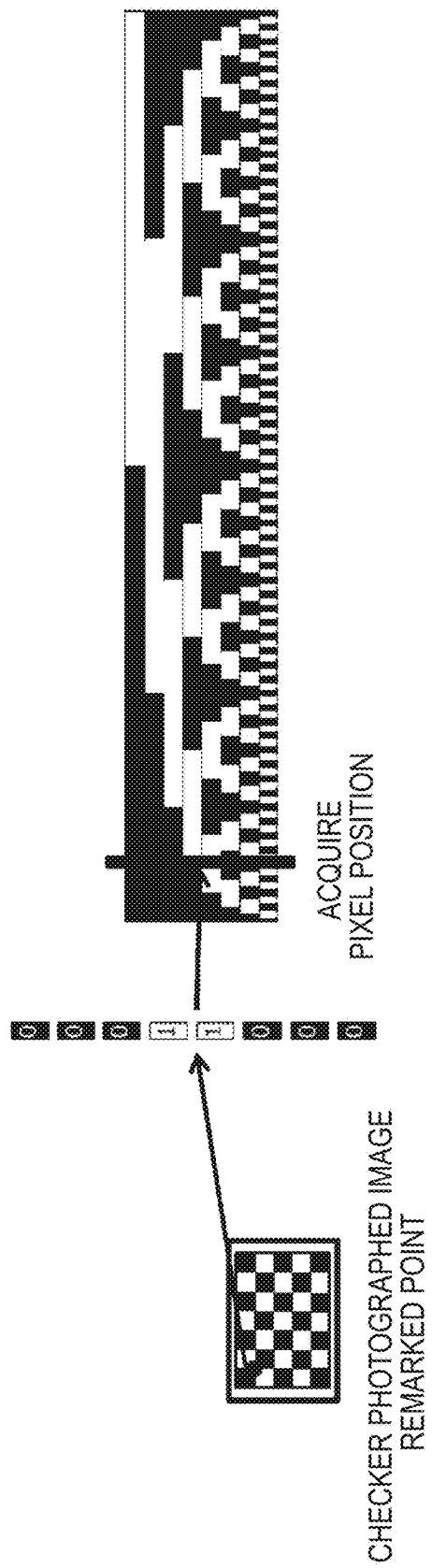
FIG. 11 is a diagram for explaining a projector coordinate calculation method using gray codes.

Here, the gray codes are projected by the projection unit 101 and photographed by the calibration camera in order to find which ray (ray from which pixel) of the projection unit 101 is projected on a lattice point, that is, projector coordinates. The projection unit 101 does not photograph an image (an image projected by the projection unit 101) like a camera. Thus, in the embodiment, the projector coordinates are acquired using the gray code pattern projection method. The calculation method of the projector coordinates using the gray code will be described with reference to FIG. 9 to FIG. 11. First, as illustrated in FIG. 9, a checker board 901 is photographed with the calibration camera to obtain a checker photographed image 902. Next, as illustrated in FIG. 10, the projection unit 101 projects gray codes constituted by 24 binary patterns of vertical straight lines and gray codes constituted by 20 binary patterns of horizontal straight lines while switching the patterns in time series, and the calibration camera photographs the gray codes every time they are projected. The binary patterns of the gray codes are projected sequentially, whereby it is possible to divide space to areas expressed by the gray codes. Then, as illustrated in FIG. 11, a code in time series is acquired to decode the gray codes for every remarked point in the checker photographed image 902 and acquire projector coordinates, that is, the corresponding pixel position. The remarked point is a lattice point of the checker, for example. When a code " . . . 0 0 0 1 1 0 0 0 . . . " (in which 1 is light and 0 is dark), for example, is obtained at a remarked lattice point, as a result of projection and photographing of the gray codes in time series, it is possible to acquire the corresponding pixel position.

The description of the processing flow of calibration of the projector will be continued with reference to FIG. 8 again. Using the gray code projection method, which ray (ray from which pixel) of the projection unit 101 is projected on a lattice point, that is, projector coordinates (x', y') is calculated (F804).

Subsequently, distortion parameters are estimated by nonlinear optimization such as the LM method, with a difference of inclination of two straight lines 804, 805 on which a group of lattice points are supposed to be arranged, as a distortion evaluation amount (F805). As described above, the distortion parameters include distortion center coordinates ($d_{cx}$, $d_{cy}$), distortion coefficients $k_1$ to $k_3$, and tangent distortion coefficients $p_1$, $p_2$ (as described above). Next, the projector coordinates (x', y') are corrected to projector coordinates (x, y) having no distortion, using the estimated distortion parameters (F806).

The relation of the corresponding point of the world coordinates (X, Y, Z) and the projector coordinates (x, y) is expressed as the above expression (9) using the perspective projection matrix K[R|T]. The perspective projection matrix is estimated by nonlinear optimization such as the LM method based on the corresponding point of the world coordinates (X, Y, Z) and the image coordinates (x, y) (F807). The K is internal parameters, and the R and T are respectively a rotating component and a translation component relative to the checker board 701 in the external parameters.

In the past, the system including a projector and a camera generally performs calibration of the projector using a calibration result of the camera. For example, after the calibration of the camera is performed by photographing a checker pattern with a known size and form with the camera, the calibration of the projector is performed by projecting the checker pattern by the projector and photographing the projection image with the camera to find a size and positional relation of the checker pattern. However, when the calibration of the projector is performed using a calibration result of the camera, there occurs a problem in which the calibration of the projector is influenced by a camera error.

For such a problem, the projection-type image display device 100 according to the embodiment projects structural light from the projection unit 101 and traces the ray. One example of the structural light is a gray code. The binary patterns of the gray code are projected sequentially, whereby the space is divided to areas expressed by the gray codes.

Figure 13:
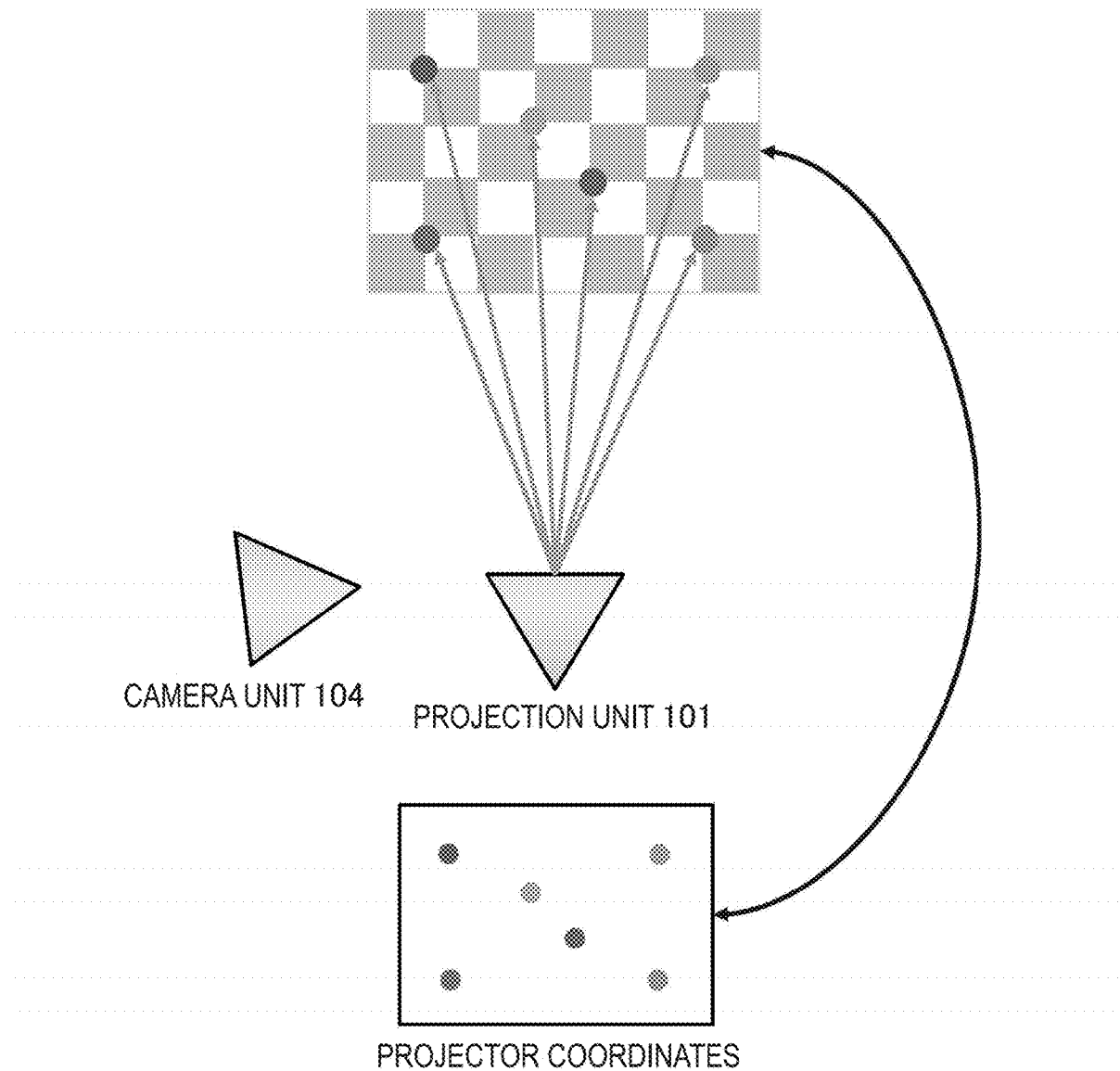
FIG. 13 is a diagram illustrating a situation in which the ray tracing of the structural light 1202 projected by the projection unit 101 is performed to obtain correspondence relation between a lattice point of the checker pattern and projector coordinates.

The camera unit 104 photographs the image obtained by projecting the structural light 1202 on the checker board 1201 by the projection unit 101 (see FIG. 12). Thus, the ray (ray from a pixel) with which a lattice point on the checker board 1201 is irradiated is traced (see FIG. 13) to obtain the correspondence relation between the lattice point of the checker and the projector coordinates. The obtaining of the correspondence relation between the lattice point of the checker and the projector coordinates by ray tracing of the structural light indicates obtaining of the relation by photographing the checker pattern by the projector, and a calibration result of the camera unit 104 is not used to obtain the correspondence relation. When the correspondence relation between each lattice point of the checker pattern and the projector coordinates is obtained, the calibration processing of the projector can be performed in pixel units by the procedure same as the calibration processing of the camera including distortion estimation (F805), distortion correction (F806), and parameter estimation (F807) (see FIG. 8), without using a calibration result of the camera.

Moreover, the calibration of the camera is performed by finding Homography between an image obtained by photographing a checker pattern having a known size and form with the camera and the original checker pattern, that is, a projective transformation matrix. In the past method in which the calibration processing of the projector is performed by photographing a checker pattern projected by a projector with a camera and finding a size and positional relation of the checker pattern using Homography of calibration of the camera (see JP 2013-214206A, for example), the lens distortion of the projector is not considered. Thus, there occurs a problem in which the parameters of the projector are not estimated with high accuracy.

By contrast, in the projection-type image display device 100 of the embodiment, the projection unit 101 projects the structural light 1202 on the checker board 1201, and the ray is traced (see FIG. 12) to obtain the correspondence relation between a lattice point of the checker and the projector coordinates. Thus, similarly to the calibration processing of the camera considering lens distortion, the calibration processing considering distortion of the lens 101A of the projection unit 101 is performed (see FIG. 13).

Moreover, in the embodiment, the structural light 1202 projected on the checker board 1201 from the projection unit 101 is ray-traced, and the correspondence relation between a lattice point of the checker pattern and the projector coordinates is found with sub-pixel accuracy of the pixel of the projection unit 101, so as to perform calibration processing of the projector in sub-pixel units.

First, the method of performing calibration processing of the projector while considering lens distortion will be described. The camera unit 104 photographs the image obtained by projecting the structural light 1202 on the checker board 1201 by the projection unit 101 (see FIG. 12). Thus, the ray (ray from a pixel) with which a lattice point on the checker board 1201 is irradiated is traced (see FIG. 13) to obtain the correspondence relation between the lattice point of the checker pattern and the projector coordinates. Such obtaining indicates obtaining of the relation by photographing the checker pattern by the projector. Moreover, similarly to the calibration processing of the camera, the distortion of the lens 101A of the projection unit 101 is considered. Thus, it is possible to estimate parameters of the projector with high accuracy.

Furthermore, the following will describe the method of finding projector coordinates at a lattice point (with sub-pixel accuracy of the camera) of the checker pattern with sub-pixel accuracy.

Figure 14:
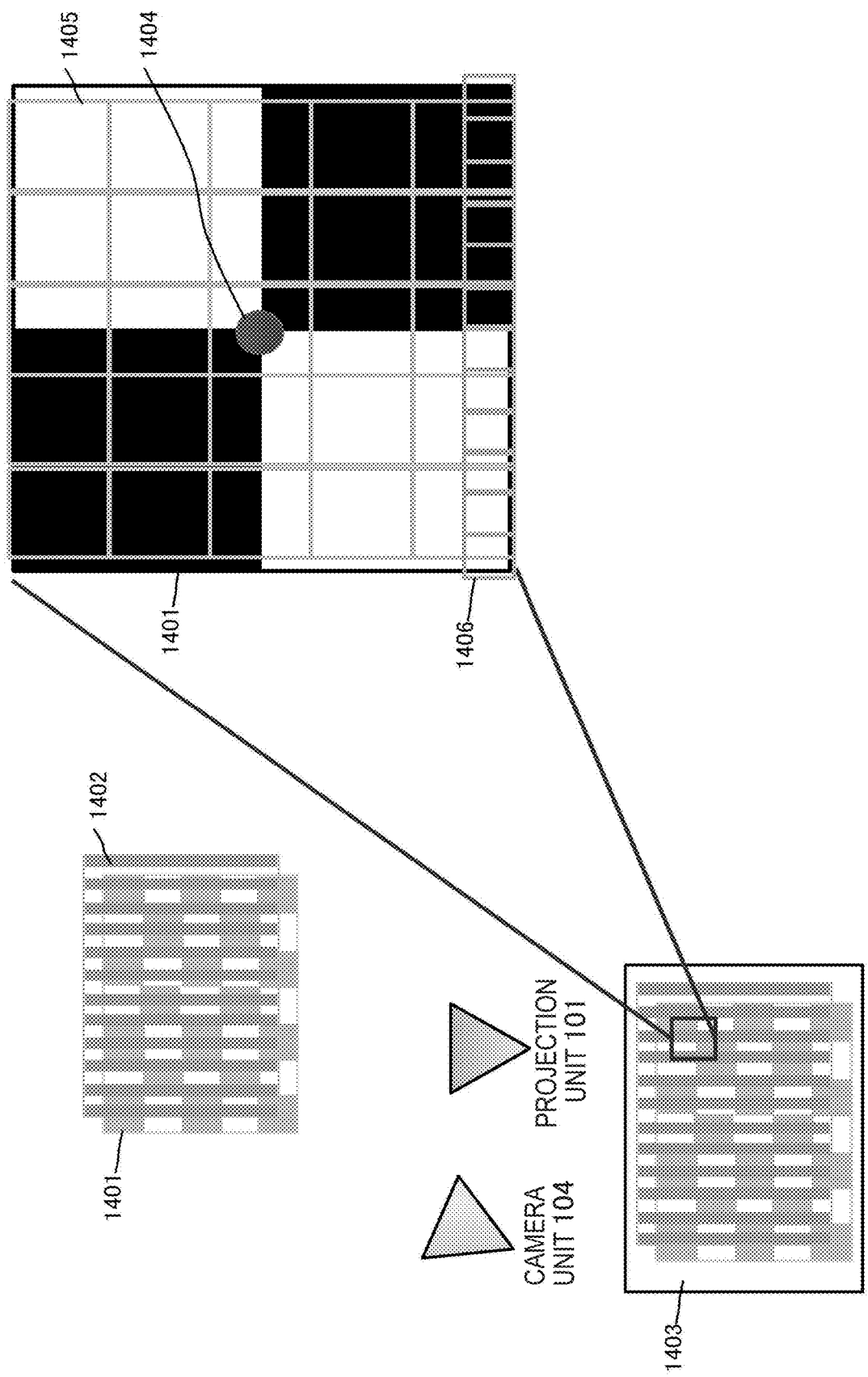
FIG. 14 is a diagram for explaining a method of finding, with sub-pixel accuracy, projector coordinates at a lattice point of the checker pattern (with sub-pixel accuracy of a camera)

FIG. 14 illustrates an image 1403 obtained by photographing, with the camera unit 104, a checker pattern 1401 on which structural light 1402 is projected from the projection unit 101, and the surroundings of a lattice point 1404 remarked on the photographed image 1403. In the surrounding of the lattice point 1404 in FIG. 14, projector pixels 1405 of the projection unit 101 and camera pixels of the camera unit 104 are also illustrated. The projector pixels 1405 obtained with pixel accuracy by ray tracing are illustrated. The correspondence relation between the camera pixels 1404 of the camera unit 104 and the projector pixels 1405 of the projection unit 101 is known. Moreover, the pixel size of the camera pixel 1406 of the camera unit 104 is smaller than the pixel size of the projector pixel 1405 of the projection unit 101.

First, using the fact that the correspondence relation between the camera pixel 1406 of the camera unit 104 and the projector pixel 1405 of the projection unit 101 is known, LocalHomography of calibration of the projector pixels 1405 limited to the surroundings of the lattice point 1404 is found based on the information of the calibration result of the camera unit 104 in the surroundings of the lattice point 1404. Here, LocalHomography of the projector pixels 1405 is found with a limit to the surrounding area of the lattice point 1404 small enough to ignore influences of distortion of the lens 101A of the projection unit 101. Moreover, the robust estimation is performed while considering a decoding error of the structural light 1402 to find LocalHomography of the projector pixels 1405. Therefore, it is possible to find projector coordinates with sub-pixel accuracy of the projector pixel 1405 of the projection unit 101.

Moreover, the projection-type image display device 100 according to the embodiment formulates both ray tracing and reverse ray tracing considering projection distortion of the projection unit 101.

Figure 15:
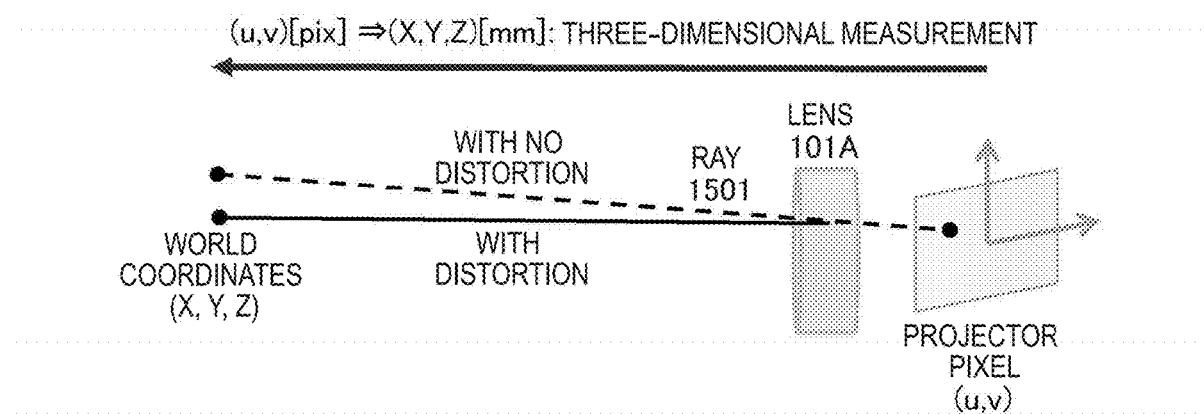
FIG. 15 is a diagram schematically illustrating a method of ray tracing considering projector distortion.

FIG. 15 schematically illustrates a method of ray tracing considering projector distortion. The ray tracing considering projector distortion is tracing of a position (X, Y, Z) [mm] on world coordinates obtained by projecting a pixel (u, v) [pix] on projector coordinates with ray 1501 influenced by distortion of the lens 101A. The formulation of ray tracing for tracing the world coordinates (X, Y, Z) based on the projector pixel (u, v) can be used when the three-dimensional measurement is performed in the projection-type image display device 100.

Figure 16:
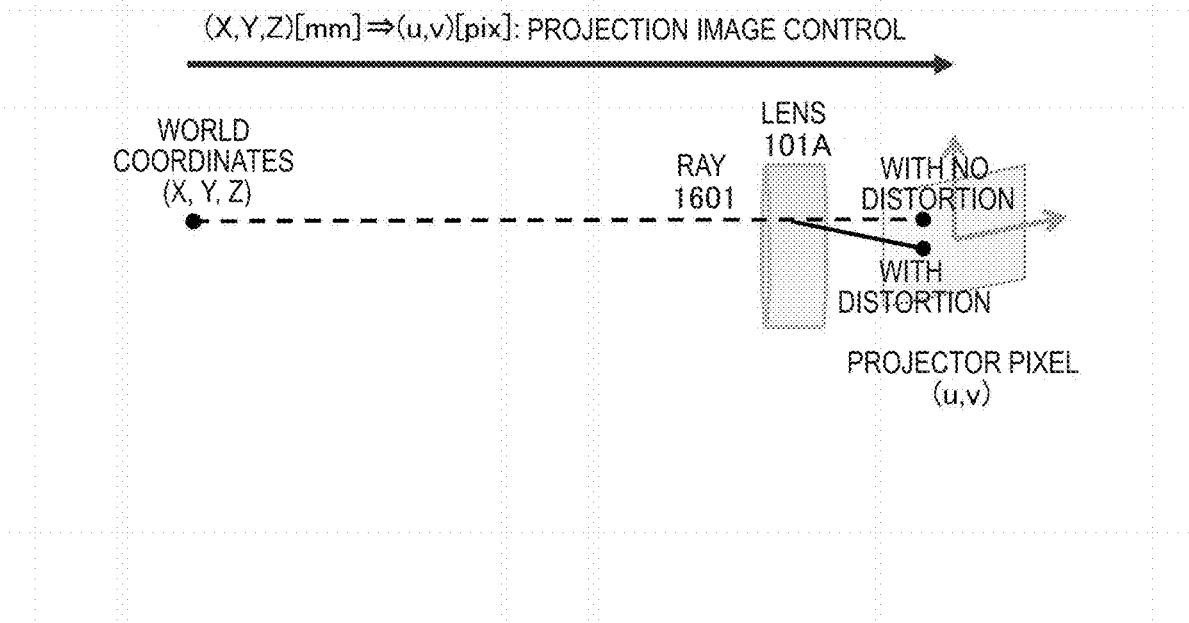
FIG. 16 is a diagram schematically illustrating a method of reverse ray tracing considering projector distortion.

FIG. 16 schematically illustrates a method of reverse ray tracing considering projector distortion. The reverse ray tracing considering projector distortion is tracing of a pixel (u, v) [pix] on projector coordinates irradiated with ray 1601 for projecting a position (X, Y, Z) [mm] on world coordinates while considering influences of distortion of the lens 101A. The formulation of reverse ray tracing for tracing the projector pixel (u, v) based on the world coordinates (X, Y, Z) can be used when the projection image control is performed in the projection-type image display device 100.

Figure 17:
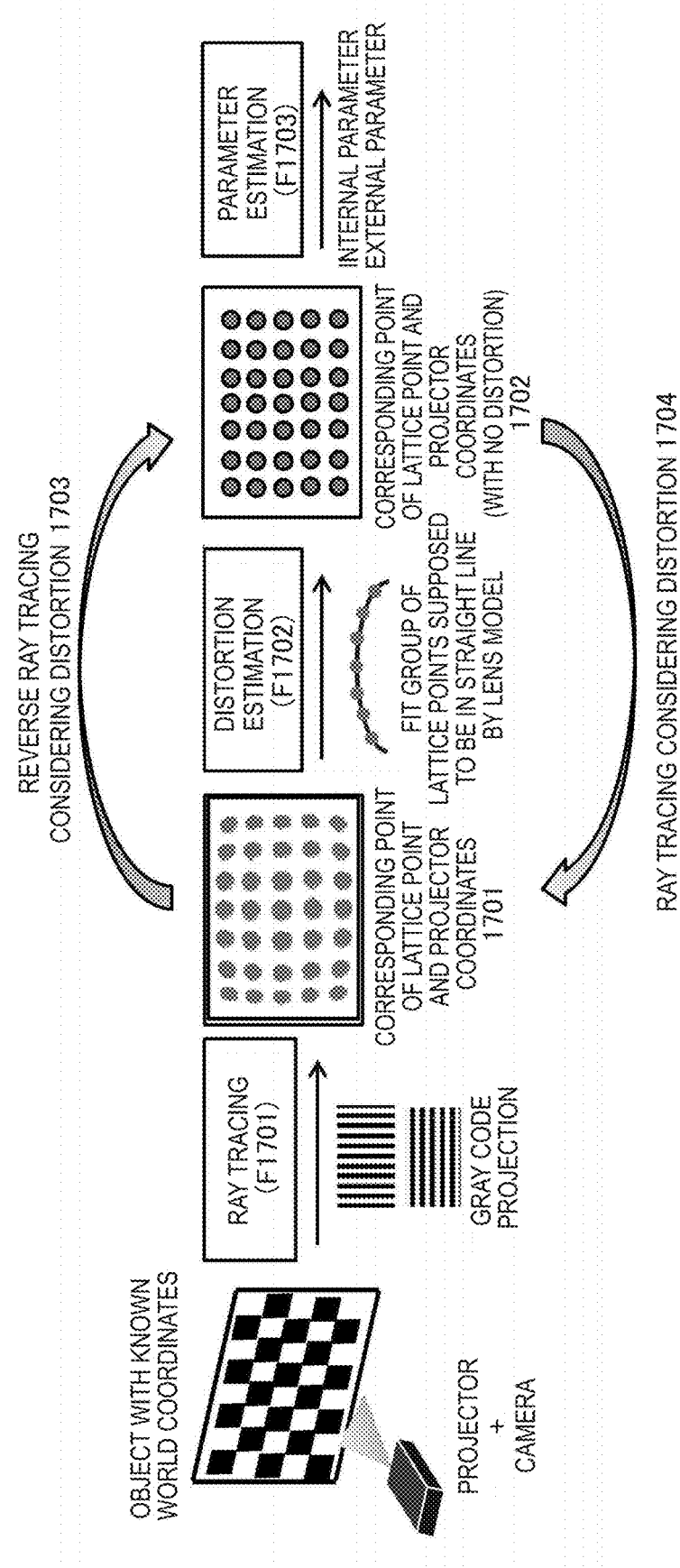
FIG. 17 is a diagram for explaining a method of performing ray tracing and reverse ray tracing considering projector distortion of the projection unit 101.

The method of performing ray tracing and reverse ray tracing considering projector distortion of the projection unit 101 will be described with reference to FIG. 17. First, the projection unit 101 projects gray codes on a checker board 1701 with a latticed pattern as an object with known world coordinates, and the camera unit 104 photographs the projection image for ray tracing (F1701) to calculate which ray (ray from which pixel) of the projection unit 101 is projected on a lattice point, that is, a corresponding point 1701 of the lattice point (X, Y, Z) on the world coordinates and the projector coordinates (x', y') in a state with projector distortion.

Next, the straight line on which a group of lattice points are supposed to be arranged is fit by the lens model, and distortion parameters are estimated by nonlinear optimization such as the LM method, for example (F1702). As described above, the distortion parameters include distortion center coordinates ($d_{cx}$, $d_{cy}$), distortion coefficients $k_1$ to $k_3$, and tangent distortion coefficients $p_1$, $p_2$ (as described above). As a result of distortion estimation (F1702), it is possible to obtain the correspondence relation between the projector coordinates (x', y') having distortion and the projector coordinates (x, y) having no distortion, as illustrated in the following expression (10).

$$(x,y)=D(x',y') \quad (10)$$

Moreover, based on the result of distortion estimation (F1702), it is possible to obtain a corresponding point 1702 of a lattice point (X, Y, Z) on the world coordinates and projector coordinates (x, y) having no distortion. Therefore, the distortion estimation (F1702) enables reverse ray tracing for tracing the projector pixel (u, v) based on which the world coordinates (X, Y, Z) are projected. That is, the estimation of a distortion correction function D for correcting the projector coordinates (x', y') having distortion to the projection coordinates (x, y) having no distortion indicates formulation of reverse ray tracing 1703 considering distortion. The relation of a corresponding point of the world coordinates (X, Y, Z) and the projector coordinates (x, y) is expressed as the above expression (9) using the perspective projection matrix K[R|T]. The perspective projection matrix is estimated by non-linear optimization such as the LM method, based on the corresponding points of the world coordinates (X, Y, Z) and the image coordinates (x, y) (F1703). The K is internal parameters, and the R and T are respectively a rotating component and a translation component relative to the checker pattern in the external parameters.

On the other hand, when a reverse distortion correction function D' for correcting the projector coordinates (x, y) having no distortion to the projector coordinates (x', y') having distortion is estimated, as illustrated in the following expression (11), it is possible to perform ray tracing for tracing world coordinates (X, Y, Z) projected based on the projector pixel (u, v) while considering projector distortion. That is, the estimation of the reverse distortion correction function D' for correcting the projector coordinates (x, y) having no distortion to the projection coordinates (x', y') having distortion indicates formulation of ray tracing 1704 considering distortion.

$$(x',y')=D'(x,y) \quad (11)$$

Figure 18:
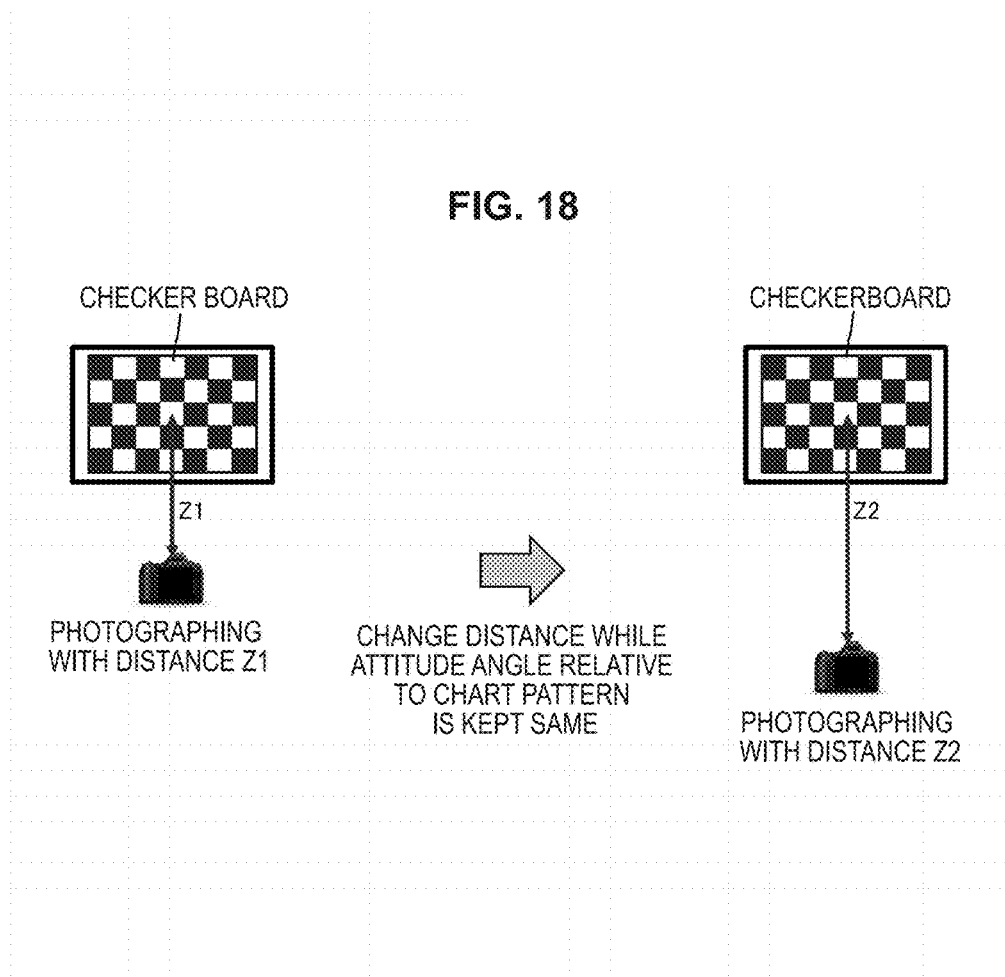
FIG. 18 is a diagram illustrating a situation in which the checker board is photographed using known depth information.

Note that when the calibration is performed using an image obtained by photographing a checker board with known feature points by the camera unit 104 (see FIG. 7, for example), it is necessary to photograph a plurality of images of the checker board while changing a visual point so as to perform calibration with high accuracy. When the number of visual points is small or the visual points have deviation, there occurs a problem in which the parameters are not estimated with high accuracy. Then, in the embodiment, the parameters are estimated with high accuracy with a small number of photographed images, using known depth information of a depth from the camera unit 104 to the checker board. As illustrated in FIG. 18, a distance from the camera unit 104 to a checker board 1801 is set to Z1, and the checker board 1801 is photographed first. Then, the distance is changed to Z2 (Z1>Z2), and the checker board 1801 is photographed while an attitude angle of the camera unit 104 relative to the checker board 1801 is kept same.

The camera unit 104 is fixed based on such two different pieces of depth information, whereby it is possible to estimate parameters with high accuracy with a small number of man-hours for adjustment. It is obvious that the parameters can be estimated with high accuracy even when the checker board 1801 is photographed using three or more distances while an attitude angle of the camera unit 104 is kept same.

In the above, the technology disclosed in the present specification has been described in detail with reference to the certain embodiment. However, it is obvious that a person skilled in the art can modify or substitute the embodiment without departing from the scope of the technology disclosed in the specification. In the specification, the embodiment of the projection-type image display device incorporating a camera has been described. Even when a camera is configured to be separable from a body of a projection-type image display device or connected externally to the body, or when a camera is substituted by a method of measuring a position or a size of a projection image based on three-dimensional position relation between a projection unit and a screen, for example, the technology disclosed in the specification can be applied in the same manner.

In short, the technology disclosed in the specification has been described using the example, and the description contents of the specification should not be interpreted restrictively. In order to determine the scope of the technology disclosed in the specification, the claims should be taken into consideration.

Additionally, the present technology may also be configured as below:

(1) An image projection device including:
  a camera;
  a projector configured to project an image;
  a camera calibration unit configured to perform calibration of the camera;
  a projector calibration unit configured to perform calibration of the projector; and
  an image correction unit configured to correct the image projected from the projector based on a result of the calibration,
  wherein the projector calibration unit performs ray tracing of a known checker pattern on which structural light is projected by the projector, and estimates parameters by acquiring correspondence relation between a lattice point of the checker pattern and projector coordinates.

(2) The image projection device according to (1),
  wherein the projector calibration unit performs calibration while considering lens distortion of the projector or without using a calibration result by the camera calibration unit.

(3) The image projection device according to (2),
  wherein the projector calibration unit estimates distortion parameters by evaluating a distortion amount based on a group of lattice points supposed to be in a straight line on the projector coordinates, and estimates parameters of the projector based on correspondence relation between a lattice point on an image after distortion correction and world coordinates.

(4) The image projection device according to (3),
  wherein the projector calibration unit estimates the distortion parameters of the projector by a Levenberg-Marquardt (LM) method, with an inclination difference between two candidates of straight lines on which a group of lattice points are supposed to be in a straight line as a distortion evaluation amount.

(5) The image projection device according to (3) or (4),
wherein the projector calibration unit estimates a perspective projection matrix including internal parameters and external parameters of the projector by nonlinear optimization, based on correspondence relation between the lattice point on the image after distortion correction and the world coordinates.

(6) The image projection device according to (5),
wherein the projector calibration unit estimates the perspective projection matrix by performing the nonlinear optimization of a re-projection error between detection image coordinates of the camera and re-projection image coordinates by the LM method.

(7) The image projection device according to (3),
wherein the projector calibration unit finds correspondence relation between the lattice point of the checker pattern and the projector coordinates with sub-pixel accuracy.

(8) The image projection device according to (3),
wherein the projector calibration unit finds LocalHomography of calibration of projector pixels limited to surroundings of the lattice point.

(9) The image projection device according to (8),
wherein the projector calibration unit finds LocalHomography of the projector pixels with a limit to a surrounding area of the lattice point small enough to ignore influences of lens distortion of the projector.

(10) The image projection device according to (9),
wherein the projector calibration unit finds the LocalHomography of the projector pixels by performing robust estimation while considering a decoding error of the structural light.

(11) The image projection device according to any one of (1) to (10),
wherein the camera calibration unit detects the lattice point from an image obtained by photographing the known checker pattern with the camera, estimates distortion parameters by evaluating a distortion amount based on a group of lattice points supposed to be in a straight line, and estimates parameters of the camera based on correspondence relation between a lattice point on an image after distortion correction and world coordinates.

(12) The image projection device according to (11),
wherein the camera calibration unit estimates the distortion parameters of the camera by an LM method, with an inclination difference between two candidates of straight lines on which a group of lattice points are supposed to be in a straight line as a distortion evaluation amount.

(13) The image projection device according to (11),
wherein the camera calibration unit estimates a perspective projection matrix including internal parameters and external parameters of the camera by nonlinear optimization, based on correspondence relation between the lattice point on the image after distortion correction and the world coordinates.

(14) The image projection device according to (13),
wherein the camera calibration unit estimates the perspective projection matrix by performing the nonlinear optimization of a re-projection error between detection image coordinates of the camera and re-projection image coordinates by the LM method.

(15) The image projection device according to any one of (1) to (14), further including:
a ray tracing formulation unit configured to formulate ray tracing for tracing world coordinates obtained by projecting a pixel on the projector coordinates with ray influenced by lens distortion.

(16) The image projection device according to any one of (1) to (15), further including:
a reverse ray tracing formulation unit configured to formulate reverse ray tracing for tracing a pixel on the projector coordinates irradiated with the ray for projecting world coordinates while considering influences of lens distortion.

(17) The image projection device according to (16),
wherein the reverse ray tracing formulation unit performs ray tracing of a gray code projected by the projector on the checker pattern with known world coordinates, calculates a corresponding point of the world coordinates and the projector coordinates in a state with projector distortion, estimates a distortion correction function, obtains correspondence relation between the world coordinates and projection coordinates having no distortion, and formulates reverse ray tracing.

(18) The image projection device according to (15),
wherein the ray tracing formulation unit estimates a reverse distortion correction function D' for correcting the projector coordinates having no distortion to projector coordinates having distortion, and formulates ray tracing for tracing world coordinates projected on a projector pixel.

(19) The image projection device according to any one of (1) to (18),
wherein at least one of the camera calibration unit and the projector calibration unit estimates the parameters with high accuracy with a small number of photographed images, using known depth information of a depth from the camera to a checker board.

(20) A calibration method of an image projection device including a camera and a projector, the calibration method including:
performing ray tracing of a known checker pattern on which structural light is projected by the projector; and
estimating parameters by acquiring correspondence relation between a lattice point of the checker pattern and projector coordinates.

What is claimed is:
1. An image projection device, comprising:
a camera;
a projector configured to:
project a first image; and
project structural light on a checker pattern; and
circuitry configured to:
calibrate the camera;
ray trace the checker pattern;
determine first distortion parameters of the projector based on evaluation of a distortion amount, wherein the distortion amount is based on a group of lattice points of the checker pattern, wherein the group of lattice points of the checker pattern constitutes a straight line on projector coordinates;
determine a first correspondence relation between a first lattice point of the group of lattice points of the checker pattern and the projector coordinates, and a second correspondence relation between a second lattice point of the group of lattice points on a second image of the checker pattern after distortion correction and world coordinates;
determine internal parameters of the projector and external parameters of the projector, based on the first correspondence relation; and
determine a first perspective projection matrix that includes the internal parameters and the external parameters of the projector by first nonlinear optimization, based on the second correspondence relation; and generate a corrected image based on correction of the first image projected from the projector, wherein the first image projected from the projector is corrected based on at least one of the determined internal parameters, the determined external parameters, or the determined first distortion parameters.

2. The image projection device according to claim 1, wherein the circuitry is further configured to determine the internal parameters of the projector and the external parameters of the projector based on lens distortion of the projector, and
wherein the determination of the internal parameters of the projector and the external parameters of the projector is independent of a calibration result of the camera.

3. The image projection device according to claim 1, wherein the circuitry is further configured to determine the first distortion parameters of the projector by a Levenberg-Marquardt (LM) method, with an inclination difference between two candidates of straight lines as the distortion amount, and
wherein the group of lattice points constitutes the straight line on each of the two candidates of straight lines.

4. The image projection device according to claim 1, wherein the circuitry is further configured to determine the first perspective projection matrix based on the first nonlinear optimization of a re-projection error between detection image coordinates of the camera and re-projection image coordinates by a Levenberg-Marquardt (LM) method.

5. The image projection device according to claim 1, wherein the circuitry is further configured to determine the first correspondence relation with sub-pixel accuracy.

6. The image projection device according to claim 1, wherein the circuitry is further configured to determine LocalHomography of calibration of a plurality of projector pixels limited to surroundings of the first lattice point of the checker pattern.

7. The image projection device according to claim 6, wherein the circuitry is further configured to determine the LocalHomography of calibration of the plurality of projector pixels with a limit to a surrounding area of the first lattice point, and wherein the surrounding area of the first lattice point excludes influences of lens distortion of the projector.

8. The image projection device according to claim 7, wherein the circuitry is further configured to determine the LocalHomography of calibration of the plurality of projector pixels based on a decoding error of the structural light.

9. The image projection device according to claim 1, wherein the circuitry is further configured to:
detect the first lattice point from a third image obtained based on photography of the checker pattern with the camera,
determine second distortion parameters of the camera based on the evaluation of the distortion amount based on the group of lattice points, and
determine internal parameters of the camera and external parameters of the camera based on the second correspondence relation.

10. The image projection device according to claim 9, wherein the circuitry is further configured to determine the second distortion parameters of the camera by a Levenberg-Marquardt (LM) method, with an inclination difference between two candidates of straight lines as the distortion amount, and wherein the group of lattice points constitutes the straight line on each of the two candidates of straight lines.

11. The image projection device according to claim 9, wherein the circuitry is further configured to determine a second perspective projection matrix including the internal parameters of the camera and the external parameters of the camera by second nonlinear optimization, based on the second correspondence relation.

12. The image projection device according to claim 11, wherein the circuitry is further configured to determine the second perspective projection matrix based on the second nonlinear optimization of a re-projection error between detection image coordinates of the camera and re-projection image coordinates by a Levenberg-Marquardt (LM) method.

13. The image projection device according to claim 1, wherein the circuitry is further configured to ray trace the world coordinates obtained by projection of a pixel on the projector coordinates with ray influenced by lens distortion.

14. The image projection device according to claim 1, wherein the circuitry is further configured to reverse ray trace a pixel on the projector coordinates, irradiated with ray, to project the world coordinates based on lens distortion.

15. The image projection device according to claim 14, wherein the circuitry is further configured to:
ray trace a gray code projected by the projector on the checker pattern with the world coordinates,
calculate a corresponding point of the world coordinates and the projector coordinates in a state with projector distortion,
determine a distortion correction function,
determine a third correspondence relation between the world coordinates and distortionless projection coordinates, and
formulate a reverse ray tracing process.

16. The image projection device according to claim 15, wherein the circuitry is further configured to:
determine a reverse distortion correction function D' to correct distortionless projector coordinates to the projector coordinates in the state with projector distortion; and
formulate a ray tracing process to ray trace the world coordinates projected on a projector pixel.

17. The image projection device according to claim 1, wherein the circuitry is further configured to determine at least one of the first distortion parameters, the internal parameters of the projector, the external parameters of the projector, internal parameter of the camera, or external parameter of the camera, with high accuracy based on a number of photographed images and depth information of a depth from the camera to a checker board, and
wherein the check pattern in on the checker board.

18. A calibration method, comprising:
in an image projection device including a camera and a projector:
projecting structural light on a checker pattern:
ray tracing the checker pattern;
determining distortion parameters of the projector by evaluating a distortion amount, wherein the distortion amount is based on a group of lattice points of the checker pattern, wherein the group of lattice points of the checker pattern constitutes a straight line on projector coordinates;
determining a first correspondence relation between a first lattice point of the group of lattice points of the checker pattern and the projector coordinates and a second correspondence relation between a second lattice point of the group of lattice points on an image of the checker pattern after distortion correction and world coordinates;

determining internal parameters of the projector and external parameters of the projector based on the first correspondence relation,
wherein the determination of the internal parameters and the external parameters of the projector is independent of camera calibration parameters; and determining a perspective projection matrix that includes the internal parameters and the external parameters of the projector by nonlinear optimization, based on the second correspondence relation.

* * * * *